(12) United States Patent
Kim et al.

(10) Patent No.: US 12,373,057 B2
(45) Date of Patent: Jul. 29, 2025

(54) TOUCH SENSING DISPLAY DEVICE (71) Applicant: LG Display Co., Ltd., Seoul (KR)

(72) Inventors: Ki Yong Kim, Paju-si (KR); Jae Kyu Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/824,096

(22) Filed: Sep. 4, 2024

(65) Prior Publication Data
US 2025/0216967 A1    Jul. 3, 2025

(30) Foreign Application Priority Data

Dec. 28, 2023    (KR) .......................... 10-2023-0194807

(51) Int. Cl.
*G06F 3/041* (2006.01)
(52) U.S. Cl.
CPC .. *G06F 3/0416* (2013.01); *G06F 2203/04104* (2013.01)
(58) Field of Classification Search
CPC .................... G06F 3/0416; G06F 2203/04104
See application file for complete search history.

(56) References Cited

U.S. PATENT DOCUMENTS

| 2014/0132541 | A1* | 5/2014 | Miyamoto | G06F 3/044 |
| | | | | 345/173 |
| 2015/0022494 | A1* | 1/2015 | Azumi | G06F 3/0445 |
| | | | | 345/174 |
| 2016/0357280 | A1* | 12/2016 | Wadia | G06F 3/0445 |
| 2019/0102022 | A1* | 4/2019 | Jang | G06F 3/044 |
| 2019/0187832 | A1* | 6/2019 | Lee | G06F 3/044 |
| 2019/0204939 | A1* | 7/2019 | Ju | G06F 3/04162 |
| 2021/0034216 | A1* | 2/2021 | Huang | G06F 3/0418 |
| 2022/0027012 | A1* | 1/2022 | Kim | G06F 3/0448 |
| 2022/0171499 | A1* | 6/2022 | Han | G06F 3/0412 |
| 2022/0206625 | A1* | 6/2022 | Park | G06F 3/0412 |
| 2022/0244806 | A1* | 8/2022 | Kim | G06F 3/0416 |

FOREIGN PATENT DOCUMENTS

KR    20220015689 A    2/2022

* cited by examiner

*Primary Examiner* — Ryan A Lubit
(74) *Attorney, Agent, or Firm* — Seed IP Law Group LLP (57) ABSTRACT

A touch sensing display device includes a first touch block including a plurality of first touch electrodes and a first additional electrode pattern, a second touch block including a plurality of second touch electrodes and a second additional electrode pattern, a first touch circuit configured to individually drive a first touch block division line connected to the first additional electrode pattern and a second touch block division line connected to the second additional electrode pattern, and a second touch circuit configured to sense each touch line in synchronization with a driving timing of each of the first touch block division line and the second touch block division line, wherein each touch line electrically connects one of the plurality of first touch electrodes to one of the plurality of second touch electrodes.

20 Claims, 10 Drawing Sheets

Real touch 1 Touch data ΔA

Ghost point 1 Touch data ΔA

Real touch 2 Touch data ΔB

Ghost point 2 Touch data ΔB

TOUCH SENSING DISPLAY DEVICE

CROSS-REFERENCE TO RELATED APPLICATIONS

This application claims the benefit of the Korean Patent Application No. 10-2023-0194807 filed on Dec. 28, 2023, which is hereby incorporated by reference as if fully set forth herein.

BACKGROUND

Technical Field

The present disclosure relates to a touch sensing display device.

Description of the Related Art

Touch sensing display device include a display panel including a touch sensor. Because the number of touch electrodes and touch lines increases as display panels enlarge in size, there is a problem where a production yield of display panels is low or the manufacturing cost increases.

Moreover, in a multi-touch input where a display panel is simultaneously touched by two or more fingers or a finger and a stylus pen, a problem may occur where an actually untouched point is abnormally recognized as a touch position due to a ghost phenomenon.

BRIEF SUMMARY

The present disclosure may provide a touch sensing display device which may differentiate a real touch position from a ghost position in a multi-touch input and may thus prevent the occurrence of a phenomenon where an actually untouched point is abnormally recognized as a touch position.

In accordance with the disclosure, as embodied and broadly described herein, a touch sensing display device includes a first touch block including a plurality of first touch electrodes and a first additional electrode pattern, a second touch block including a plurality of second touch electrodes and a second additional electrode pattern, a first touch circuit configured to individually drive a first touch block division line connected to the first additional electrode pattern and a second touch block division line connected to the second additional electrode pattern, and a second touch circuit configured to sense each touch line in synchronization with a driving timing of each of the first touch block division line and the second touch block division line, wherein each touch line electrically connects one of the plurality of first touch electrodes to one of the plurality of second touch electrodes.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms "comprise," "having," "including" and the like suggest that other parts can be added unless the term "only" is used. As used herein, the singular forms "a," "an," and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~," "over~," "under~," and "next~," one or more other parts may be disposed between the two parts unless "just" or "direct" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 1:
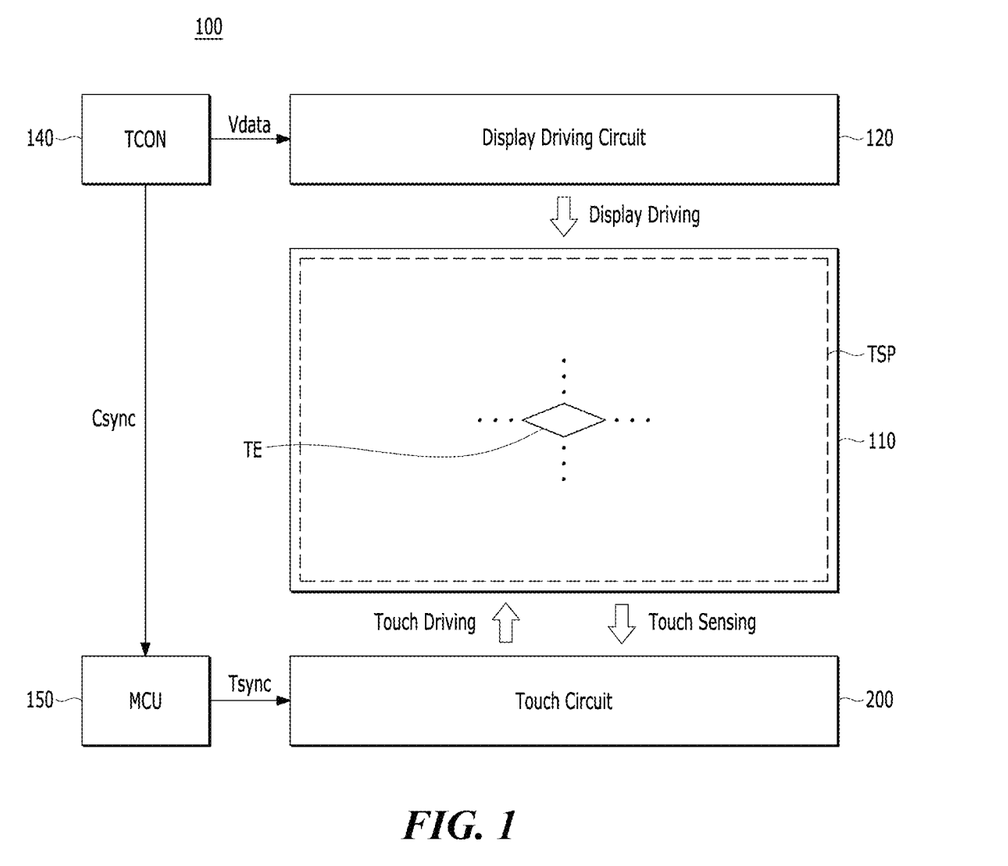
FIG. 1 is a diagram schematically illustrating a touch sensing display device according to the present embodiment.

FIG. 1 is a diagram schematically illustrating a touch sensing display device 100 according to the present embodiment.

Referring to FIG. 1, the touch sensing display device 100 according to the present embodiments may provide a display function of reproducing an input image in a screen thereof and a touch sensing function of sensing a touch input of a user.

The touch sensing display device 100 may include a display panel 110 where data lines and gate lines are provided and a display driving circuit 120 for driving the display panel 110.

In terms of functions, the display driving circuit 120 may include a data driving circuit for driving the data lines, a gate driving circuit for driving the gate lines, and a controller for controlling the data driving circuit and the gate driving circuit. The display driving circuit 120 may be implemented as one or more integrated circuits (ICs).

The touch sensing display device 100 may include a touch screen panel TSP where a plurality of touch electrodes TE are disposed for touch sensing and a touch circuit 200 which performs driving and sensing processing of the touch screen panel TSP.

The touch screen panel TSP may be an external type where the touch screen panel TSP is manufactured independently from the display panel 110 and is bonded to the display panel 110, or may be an internal type where the touch screen panel TSP is manufactured together in a manufacturing process of the display panel 110 and is provided in the display panel 110. In the touch sensing display device 100 according to the present embodiment, the touch screen panel TSP may be an independent panel including the touch sensing function, or may denote the display panel 110 which has all of the touch sensing function and the display function. Hereinafter, the internal type where the touch screen panel TSP is in the display panel 110 will be described for example.

The touch circuit 200 may supply a touch driving signal to the display panel 110, may receive a touch sensing signal from the display panel 110, and may detect touch coordinates and whether there is a touch, based on the touch sensing signal. The touch circuit 200 may be implemented as one element or two or more elements (for example, integrated circuit (IC)) and may be implemented independently from the display driving circuit 120. Also, all or a portion of the touch circuit 200 may be integrated and implemented in the display driving circuit 120 or an internal circuit thereof. For example, a portion of the touch circuit 200 may be implemented as an IC along with the data driving circuit of the display driving circuit 120.

The touch sensing display device 100 may include a micro control unit (MCU) 150 which controls the touch circuit 200. The micro control unit 150 may be supplied with a control synchronization signal Csync from a timing controller (TCON) 140 and may generate a touch synchronization signal Tsync for controlling the touch circuit 200, based on the control synchronization signal Csync.

The micro control unit 150 may transfer or receive the touch synchronization signal Tsync, based on an interface defined between the touch circuit 200 and the micro control unit 150. The micro control unit 150 may be formed as one IC type along with a touch controller of the touch circuit 200, or may be implemented as one IC type along with the timing controller 140.

The touch sensing display device 100 may include the timing controller (TCON) 140 which controls the display driving circuit 120 and the micro control unit 150. The timing controller 140 may be supplied with a data signal Vdata of an input video and a timing signal such as a vertical synchronization signal, a horizontal synchronization signal, a data enable signal, and a dot clock from a host system (not shown).

The timing controller 140 may control a gate driving timing of the display driving circuit 120, based on a scan timing control signal such as a gate start pulse, a gate shift clock, and a gate output enable signal. Also, the timing controller 140 may control a data driving timing of the display driving circuit 120, based on a data timing control signal such as a source sampling clock and a source output enable signal.

The touch sensing display device 100 may sense touch coordinates and whether there is a touch, based on a capacitance difference occurring in the touch electrodes TE.

The touch sensing display device 100 may be devices of various types such as a liquid crystal display (LCD) device, an organic light emitting display device, a plasma display panel, and a quantum dot display device.

For example, when the touch sensing display device 100 according to embodiments of the present disclosure is an LCD device, the plurality of touch electrodes TE may be disposed in the display panel 110 and may be common electrodes to which a common voltage for display driving is applied.

Figure 2:
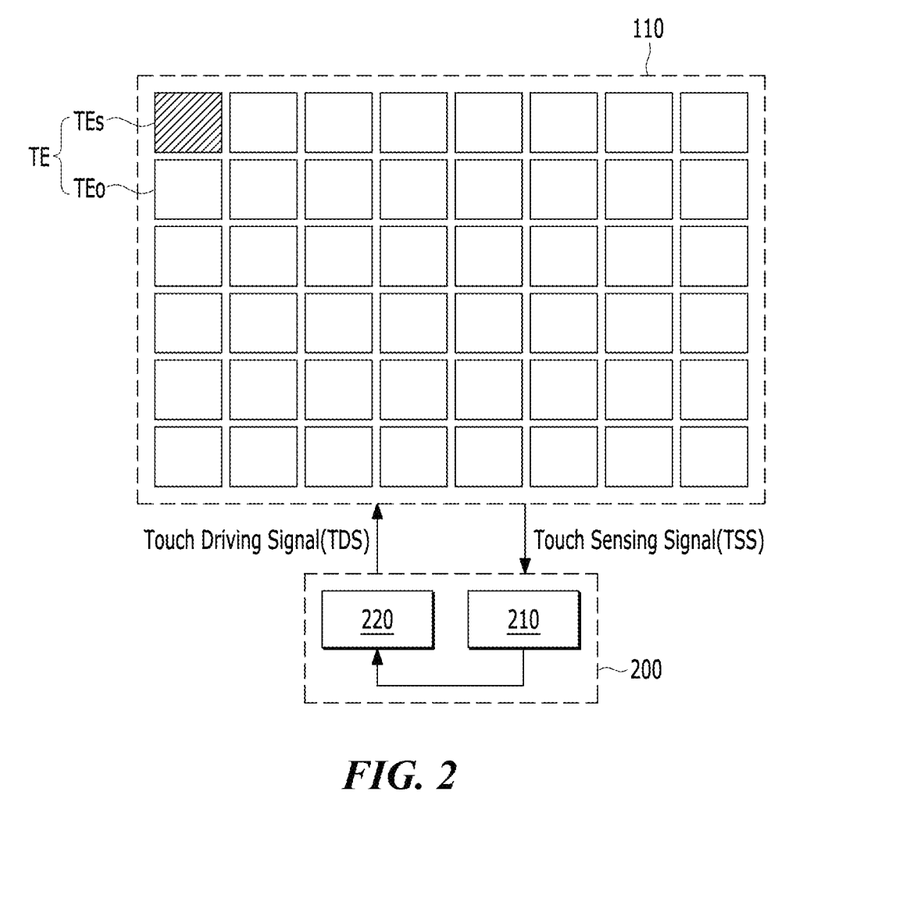
FIG. 2 is a diagram illustrating an example of a touch sensing operation in a touch sensing display device according to the present embodiment.

FIG. 2 is a diagram illustrating an example of a touch sensing operation in a touch sensing display device 100 according to the present embodiment.

Referring to FIG. 2, the touch sensing display device 100 according to the present embodiment may include a plurality of touch electrodes TE which perform a function of a touch sensor and a touch circuit 200 which sequentially drives the plurality of touch electrodes TE to sense a touch input, so as to provide a touch sensing function.

The touch circuit 200 may sequentially perform driving and sensing of the plurality of touch electrodes TE in a touch sensing period where touch sensing is performed, and thus, may sense whether there is a touch input and touch coordinates of a position to which the touch input is applied.

The touch circuit 200 may select at least one of the plurality of touch electrodes TE as a touch electrode TEs which is to be sensed and may supply a touch driving signal TDS to the selected touch electrode TEs. Subsequently, based on a touch sensing signal TSS received from an unselected touch electrode TEo and the selected touch electrode TEs, the touch circuit 200 may calculate the amount of variation of a capacitance (or the amount of variation of a voltage or the amount of variation of a charged voltage) of each touch electrode TE, may sense whether there is a touch input, and may calculate touch coordinates of a position to which the touch input is applied.

The touch circuit 200, for example, may include a touch sensing circuit 210 which supplies the touch driving signal TDS to the display panel 110 and the touch sensing signal TSS from the touch electrode TEs at a position corresponding to the touch driving signal TDS and a touch controller 220 which controls generating of a signal associated with touch sensing and performs a touch process of receiving the touch sensing signal TSS from the touch sensing circuit 210 to detect whether there is a touch and calculate touch coordinates.

Here, a touch sensing period where touch sensing is performed may be temporally separated from a display driving period where an image is displayed on the display panel 110 and may be performed at the same with the display driving period. In the touch sensing period, an alternating current (AC) signal having the same phase and amplitude as those of the touch driving signal TDS may be supplied to a data line and a gate line of the display panel 110, and thus, load free driving for reducing an adverse effect of a parasitic capacitance of the touch electrode TE on a touch sensing result may be performed. In this case, the touch driving signal TDS may be referred to as a load free driving signal.

A size of the touch electrode TE disposed in the display panel 110 may correspond to an area size of one subpixel, or may correspond to an area size of two or more subpixels. Also, each touch electrode TE may be a plate type where there is no opening portion, or may be a mesh type including one or more opening portions. For example, in a case where one touch electrode TE is a mesh type and has a size corresponding to an area size of two or more subpixels, one touch electrode TE may include two or more opening portions, and a position and a size of each of the two or more opening portions may correspond to a position and a size of an emission region of a corresponding subpixel.

The display panel 110 may be a split connection type where each touch electrode TE is connected to one touch line, or may be a multi-connection type where the plurality of touch electrodes TE are connected to one touch line in common.

Figure 3:
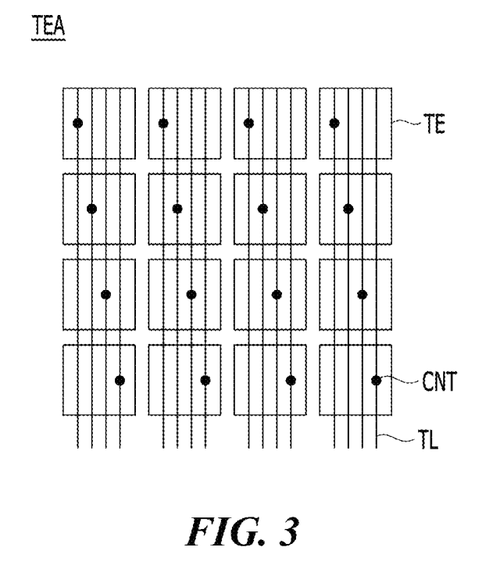
FIG. 3 is a diagram illustrating a touch electrode array of a split connection type capable of being included in a display panel.

FIG. 3 is a diagram illustrating a touch electrode array TEA of a split connection type capable of being included in a display panel.

Referring to FIG. 3, in the touch electrode array TEA of the split connection type, each touch electrode TE may be divisionally connected to one touch line. A plurality of touch electrodes TE may be disposed in an active region. Depending on the case, some (for example, an outermost touch electrode) of the plurality of touch electrodes TE may be disposed in an outer region (or an external region) surrounding the active region, or may extend up to the outer region from the active region. Here, the active region may be a region which displays an image, or may be region capable of touch sensing.

All of a plurality of touch lines TL may be disposed from a point connected to the touch sensing circuit 210 up to an opposite point to have the same length or similar lengths. In each of the plurality of touch lines TL, only a position (i.e., a position of a contact hole CNT) electrically connected to a corresponding touch electrode TE may be changed.

As described above, in the touch electrode array TEA of the split connection type, because one touch electrode TE should be electrically connected to one touch line TL, the number of touch lines TL may be equal to the number of touch electrodes TE. Here, the number of touch lines TL may correspond to the number of touch channels for a signal input/output of the touch sensing circuit 210. As in FIG. 3, in a case where the touch electrode array TEA of the split connection type is configured with 4×4 touch electrodes, sixteen touch lines TL respectively connected to sixteen touch electrode TE may be disposed in the touch electrode array TEA, and thus, there may be sixteen touch channels.

Figure 4:
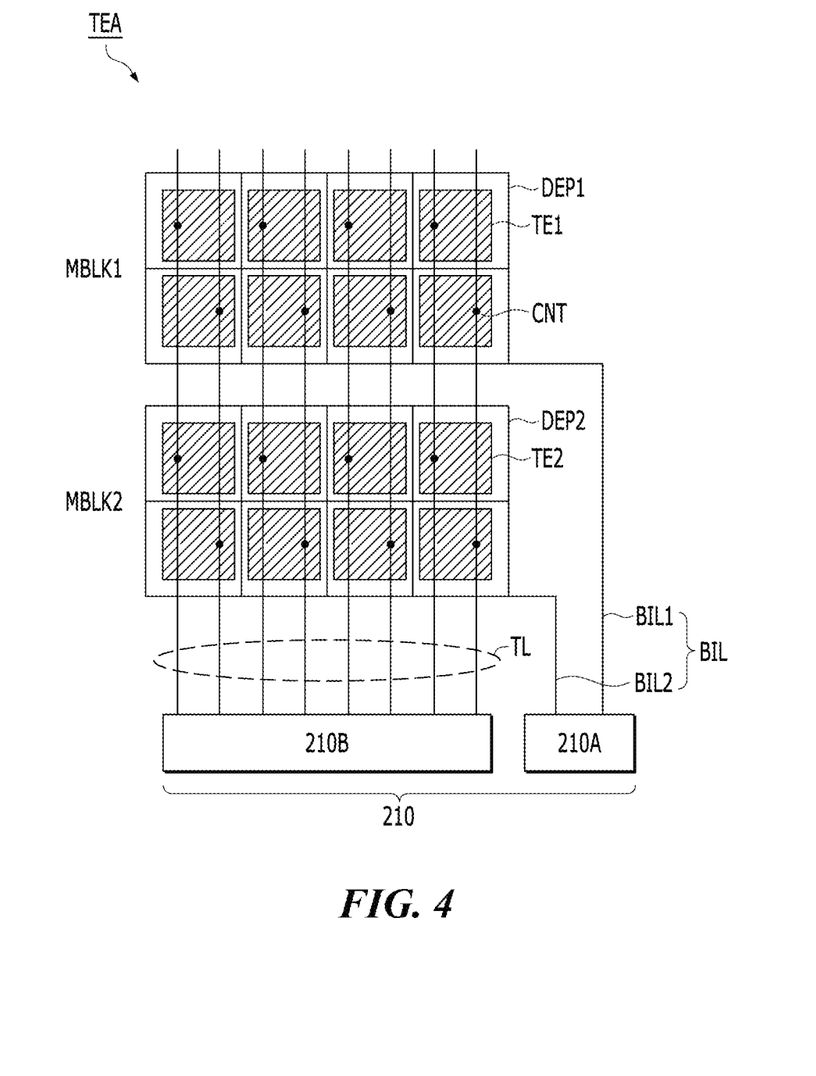
FIG. 4 is a diagram illustrating a touch electrode array of a multi-connection type capable of being included in a display panel.

FIG. 4 is a diagram illustrating a touch electrode array TEA of a multi-connection type capable of being included in a display panel.

Referring to FIG. 4, in the touch electrode array TEA of the multi-connection type, a plurality of touch electrodes TE1 and TE2 may be connected to a touch line TL through different contact holes CNT. The multi-connection type may more easily decrease the number of touch lines TL (i.e., the number of touch channels) than the split connection type. Because the number of touch electrodes and touch lines TL increases as display panels enlarge in size, a production yield of display panels may be low or the manufacturing cost may increase. Such a problem may be effectively solved by the multi-connection type.

The touch electrode array TEA of the multi-connection type may include a plurality of touch blocks MBLK1 and MBLK2. Sizes of the plurality of touch blocks MBLK1 and MBLK2 may be equal to each other. In FIG. 4, for convenience of description, the number of touch blocks MBLK1 and MBLK2 is illustrated as two, but the disclosure is not limited thereto.

Touch electrodes TE1 and TE2 of positions corresponding to each other between the plurality of touch blocks MBLK1 and MBLK2 may be connected to a same touch line TL. For example, in a case where each touch block is configured with 4×2 touch electrodes TE, touch electrodes TE1 and TE2 of (1,1) position may be connected to a first touch line TL, touch electrodes TE1 and TE2 of (2,1) position may be connected to a second touch line TL, and touch electrodes TE1 and TE2 of (1,2) position may be connected to a third touch line TL. In this manner, touch electrodes TE1 and TE2 of (2,4) position may be connected to an eighth touch line TL. Accordingly, the multi-connection type may decrease by the number of touch lines TL (1/touch block number) compared to the split connection type.

The touch lines TL may be disposed in the active region. Depending on the case, all or some of the touch lines TL may be disposed outside the active region. In a case where the touch lines TL are disposed in the active region, the touch lines TL may be disposed on a layer which differs from the touch electrodes TE and may overlap the touch electrodes TE.

Furthermore, because touch electrodes TE1 and TE2 of positions corresponding to each other are connected to a same touch line TL, a plurality of touch block division lines BIL may be provided for determining whether a touch input is performed in one of the plurality of touch blocks MBLK1 and MBLK2. The number of touch block division lines BIL may be equal to the number of touch blocks. For example, in FIG. 4, the number of touch block division lines BIL may be two.

A first touch block division line BIL1 may be connected to a first additional electrode pattern DEP1 included in a first touch block MBLK1. In the first touch block MBLK1, the first additional electrode pattern DEP1 may divide a plurality of first touch electrodes TE1. That is, the first additional electrode pattern DEP1 may have a mesh shape to surround each of the plurality of first touch electrodes TE1, in the same plane (or the same layer). The first touch block division line BIL1 may be formed to extend from the first additional electrode pattern DEP1, in the same plane. Also, the first touch block division line BIL1 may be disposed in a plane which differs from the first additional electrode pattern DEP1 and may be connected to the first additional electrode pattern DEP1 through a contact hole.

A second touch block division line BIL2 may be connected to a second additional electrode pattern DEP2 included in a second touch block MBLK2. In the second touch block MBLK2, the second additional electrode pattern DEP2 may divide a plurality of second touch electrodes TE2. That is, the second additional electrode pattern DEP2 may have a mesh shape to surround each of the plurality of second touch electrodes TE2, in the same plane (or the same layer). The second touch block division line BIL2 may be formed to extend from the second additional electrode pattern DEP2, in the same plane. Also, the second touch block division line BIL2 may be disposed in a plane which differs from the second additional electrode pattern DEP2 and may be connected to the second additional electrode pattern DEP2 through a contact hole.

In the present embodiment, the first additional electrode pattern DEP1 may be disposed in the same layer as the first touch electrodes TE1, or may be disposed in a layer which differs from the touch lines TL. Likewise, the second additional electrode pattern DEP2 may be disposed in the same layer as the second touch electrodes TE2, or may be disposed in a layer which differs from the touch lines TL.

In the present embodiment, the touch sensing circuit 210 may be divided into a first touch circuit 210A and a second touch circuit 210B.

The first touch circuit 210A may individually drive the first touch block division line BIL1 connected to the first additional electrode pattern DEP1 and the second touch block division line BIL2 connected to the second additional electrode pattern DEP2. The first touch circuit 210A may generate a first touch block driving signal to supply to the first touch block division line BIL1 and may generate a second touch block driving signal to supply to the second touch block division line BIL2. The first touch circuit 210A may perform a function of a TX driver.

The second touch circuit 210B may sense each touch line TL in synchronization with a driving timing of each of the first touch block division line BIL1 and the second touch block division line BIL2. The second touch circuit 210B may receive the amount of variation of a capacitance (or the amount of variation of a voltage or the amount of variation of a charged voltage) of each of the first and second touch electrodes TE1 and TE2. The second touch circuit 210B may perform a function of an RX driver.

The touch sensing display device according to the present embodiment may be a capacitance-based touch sensing type and may sense a touch in a mutual capacitance type between a TX electrode and a RX electrode. In the present embodiment, the additional electrode patterns DEP1 and DEP2 may be TX electrodes to which the first and second touch block driving signals are applied, and the touch electrodes TE1 and TE2 may be RX electrodes which output a variation value of a capacitance through a touch line. In a mutual capacitance-based touch sensing type, based on whether there is a point such as a finger or a pen, touch coordinates and whether there is a touch input may be detected based on a variation of a mutual capacitance generated between the TX electrode and the RX electrode.

Figure 9:
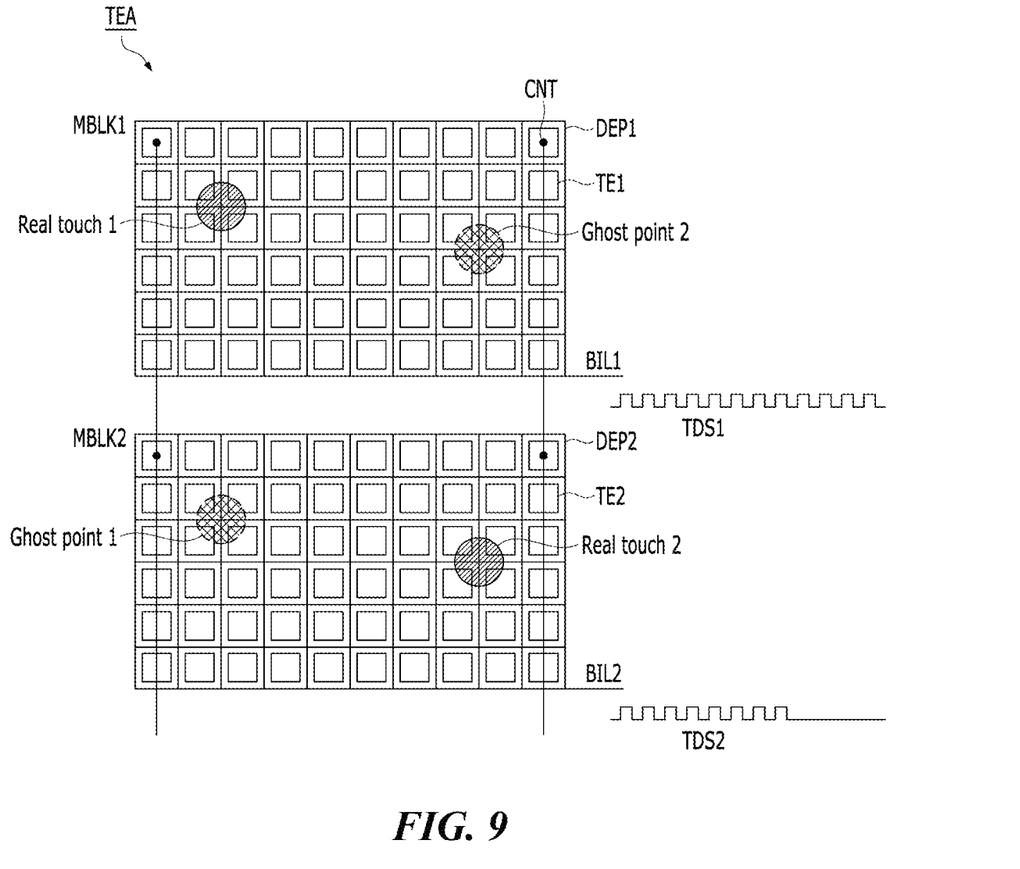
FIGS. 9 and 10 are diagrams for describing the principle that differentiates a real touch position from a ghost position in a touch circuit according to the present embodiment.

In the touch electrode array TEA of the multi-connection type according to the present embodiment, when a multi touch is simultaneously input to the plurality of touch blocks MBLK1 and MBLK2, a ghost phenomenon may occur as in FIG. 9. A ghost may occur based on an actually touched real touch 1 at a ghost point 1, and a ghost may occur based on an actually touched real touch 2 at a ghost point 2. The reason that the ghosts occur may be because touch electrodes TE1 and TE2 of positions corresponding to each other between the plurality of touch blocks MBLK1 and MBLK2 are connected to one touch line TL. An actually touched position may be the real touches 1 and 2 and may be 2 points, but a position recognized as a touch may be the real touches 1 and 2 and the ghost points 1 and 2 and may be 4 points.

Figure 5:
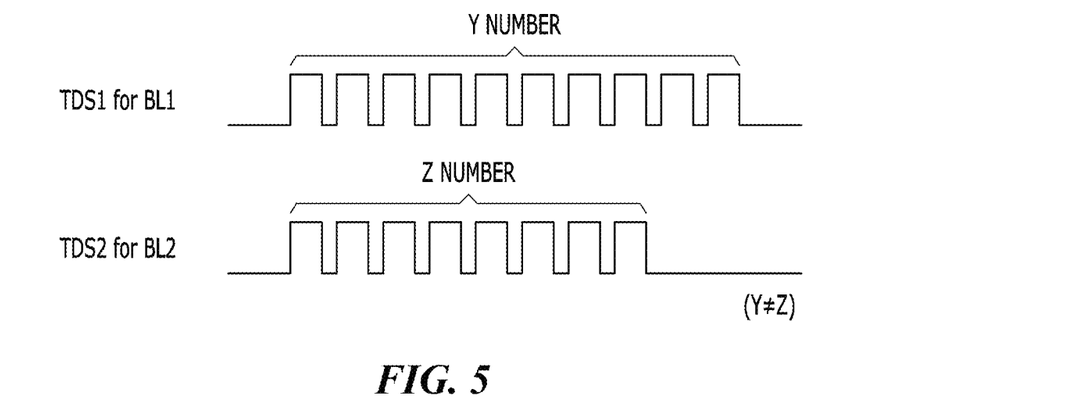
FIG. 5 is a diagram illustrating an example of a first touch block driving signal and a second touch block driving signal applied to a touch electrode array of a multi-connection type.
Figure 6:
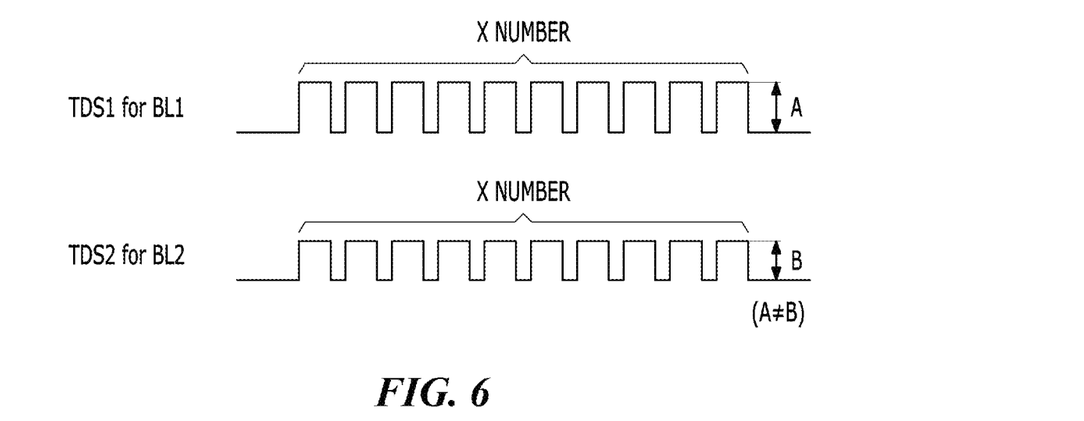
FIG. 6 is a diagram illustrating another example of a first touch block driving signal and a second touch block driving signal applied to a touch electrode array of a multi-connection type.
Figure 7:
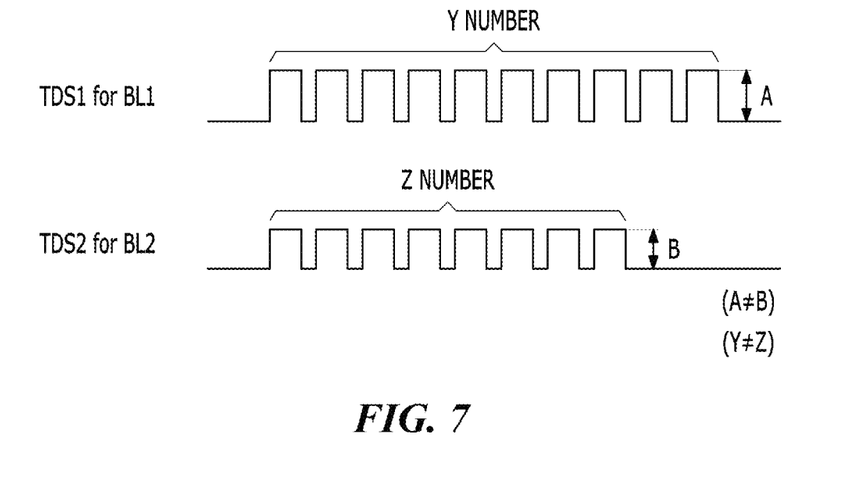
FIG. 7 is a diagram illustrating another example of a first touch block driving signal and a second touch block driving signal applied to a touch electrode array of a multi-connection type.

FIGS. 5 to 7 illustrate driving waveforms of touch block driving signals for differentiating a real touch position from a ghost position when applying a multi-touch input to a touch electrode array of a multi-connection type.

The first touch circuit 210A may supply a first touch block driving signal TDS1, which is for implementing first touch sensitivity, to the first additional electrode pattern DEP1 through the first touch block division line BIL1.

The first touch circuit 210A may supply a second touch block driving signal TDS1, which is for implementing second touch sensitivity, to the second additional electrode pattern DEP2 through the second touch block division line BIL2.

To differentiate a real touch position from a ghost position when applying a multi-touch input, the first touch sensitivity (or first touch raw data) implemented by the first touch block driving signal TDS1 may differ from the second touch sensitivity (or second touch raw data) implemented by the second touch block driving signal TDS2.

Touch sensitivity may be affected by the number of pulses and a pulse amplitude of a touch block driving signal. As the number of pulses increases and a pulse amplitude increases, touch sensitivity may increase.

As in FIG. 5, the number of pulses of the first touch block driving signal TDS1 may differ from the number of pulses of the second touch block driving signal TDS2. For example, the number of pulses of the first touch block driving signal TDS1 may be a Y number, and the number of pulses of the second touch block driving signal TDS2 may be a Z number which is less than the Y number. When the number of pulses differs although pulse amplitudes are equal to each other, because the amount of accumulation of sensing performed in the second touch circuit 210B is changed, a real touch position and a ghost position may be effectively differentiated from each other when applying a multi-touch input.

As in FIG. 6, a pulse amplitude of the first touch block driving signal TDS1 may differ from a pulse amplitude of the second touch block driving signal TDS2. For example, the pulse amplitude of the first touch block driving signal TDS1 may be A, and the pulse amplitude of the second touch block driving signal TDS2 may be B which is less than A. When pulse amplitudes differ although the number of pulses is the same, because the amount of accumulation of sensing performed in the second touch circuit 210B is changed, a real touch position and a ghost position may be effectively differentiated from each other when applying a multi-touch input.

As in FIG. 7, the number of pulses and an amplitude of the first touch block driving signal TDS1 may differ from the number of pulses and an amplitude of the second touch block driving signal TDS2. For example, the number of pulses and an amplitude of the first touch block driving signal TDS1 may be a Y number and A, and the number of pulses and an amplitude of the second touch block driving signal TDS2 may be a Z number and B. When the number of pulses differs and pulse amplitudes differ, because the amount of accumulation of sensing performed in the second touch circuit 210B is more changed, a real touch position and a ghost position may be effectively differentiated from each other when applying a multi-touch input.

Figure 8:
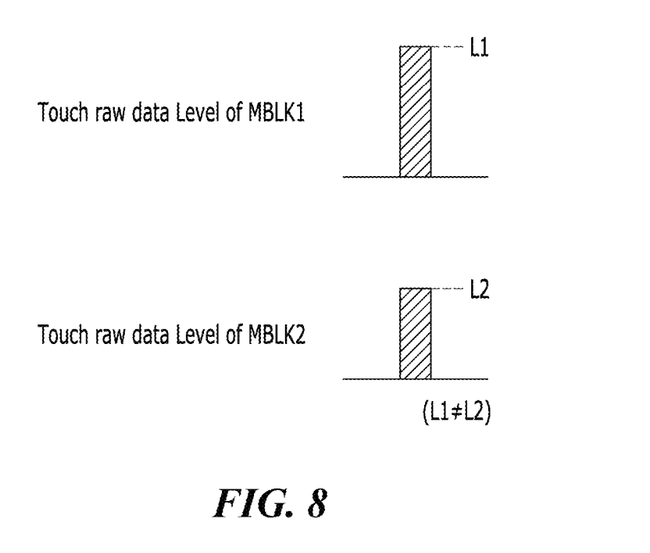
FIG. 8 is a diagram illustrating a touch raw data level of a first touch block and a touch raw data level of a second touch block.

FIG. 8 is a diagram illustrating a touch raw data level of a first touch block and a touch raw data level of a second touch block.

Referring to FIG. 8, when the number of pulses of the first touch block driving signal TDS1 is 10, a touch raw data level of a first touch block obtained by the second touch circuit 210B may be "L1". On the other hand, when the number of pulses of the second touch block driving signal TDS2 is 8, a touch raw data level of a second touch block obtained by the second touch circuit 210B may be "L2" which is less than "L1".

Figure 10:
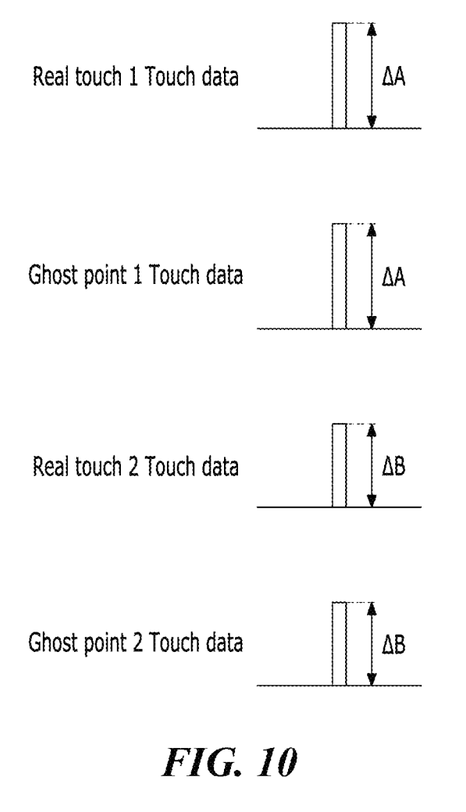

FIGS. 9 and 10 are diagrams for describing the principle that differentiates a real touch position from a ghost position in a touch circuit according to the present embodiment.

Referring to FIGS. 9 and 10, a position to which a touch is actually input may be a real touch 1 and a real touch 2.

A ghost of a ghost point 1 may occur due to an actually touched real touch 1. A ghost phenomenon, where touch raw data is output although a touch is not actually applied, may occur at a ghost point 1 of a second touch block MBLK2 corresponding to a real touch 1 of a first touch block MBLK1.

A ghost of a ghost point 2 may occur due to an actually touched real touch 2. A ghost phenomenon, where touch raw data is output although a touch is not actually applied, may occur at a ghost point 2 of the first touch block MBLK1 corresponding to a real touch 2 of the second touch block MBLK2.

A first touch block driving signal TDS1 having ten pulses may be applied to a first additional electrode pattern DEP1 through a first touch block division line BIL1. A level of touch raw data obtained in the first touch block MBLK1 may be ΔA.

A second touch block driving signal TDS2 having eight pulses may be applied to a second additional electrode pattern DEP2 through a second touch block division line BIL2. A level of touch raw data obtained in the second touch block MBLK2 may be ΔB which is less than ΔA. That is, ΔA>ΔB.

When the real touch 1 is input to the first touch block MBLK1, touch raw data having ΔA level may occur, and a ghost having ΔA size may occur at the ghost point 1 of the second touch block MBLK2. Because a size of touch raw data occurring at the ghost point 1 of the second touch block MBLK2 is ΔA instead of ΔB, the touch circuit 200 according to the present embodiment may determine that the ghost point 1 is not a real touch position. That is, because touch raw data of ΔB is output at a real touch position of the second touch block MBLK2, when a size of the touch raw data is ΔA instead of ΔB, the ghost point 1 may be determined.

When the real touch 2 is input to the second touch block MBLK2, touch raw data having ΔB level may occur, and a ghost having ΔB size may occur at the ghost point 2 of the first touch block MBLK1. Because a size of touch raw data occurring at the ghost point 2 of the first touch block MBLK1 is ΔB instead of ΔA, the touch circuit 200 according to the present embodiment may determine that the ghost point 2 is not a real touch position. That is, because touch raw data of ΔA is output at a real touch position of the first touch block MBLK1, when a size of the touch raw data is ΔB instead of ΔA, the ghost point 2 may be determined.

Figure 11:
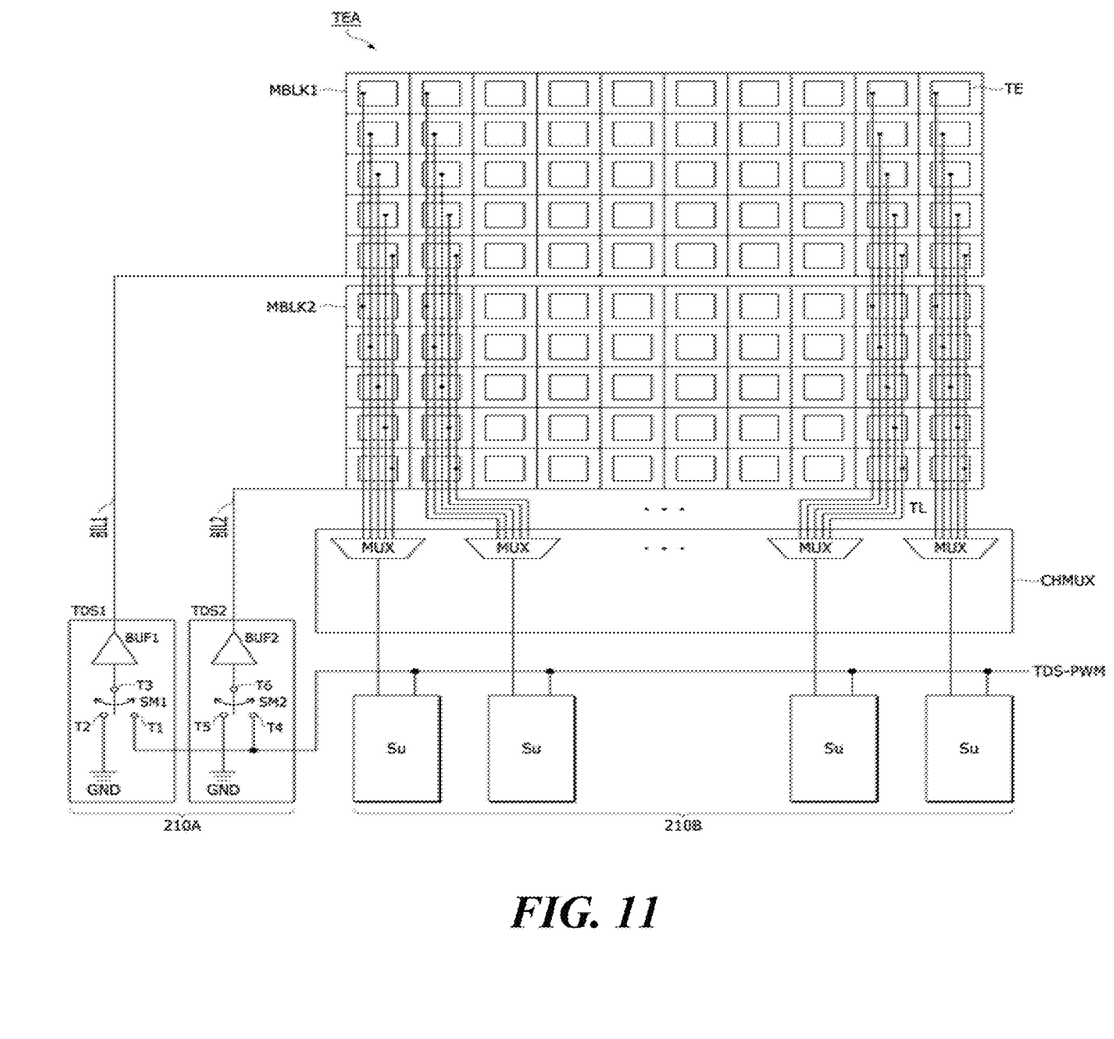
FIG. 11 is a diagram illustrating a detailed configuration of a touch circuit according to the present embodiment.
Figure 12:
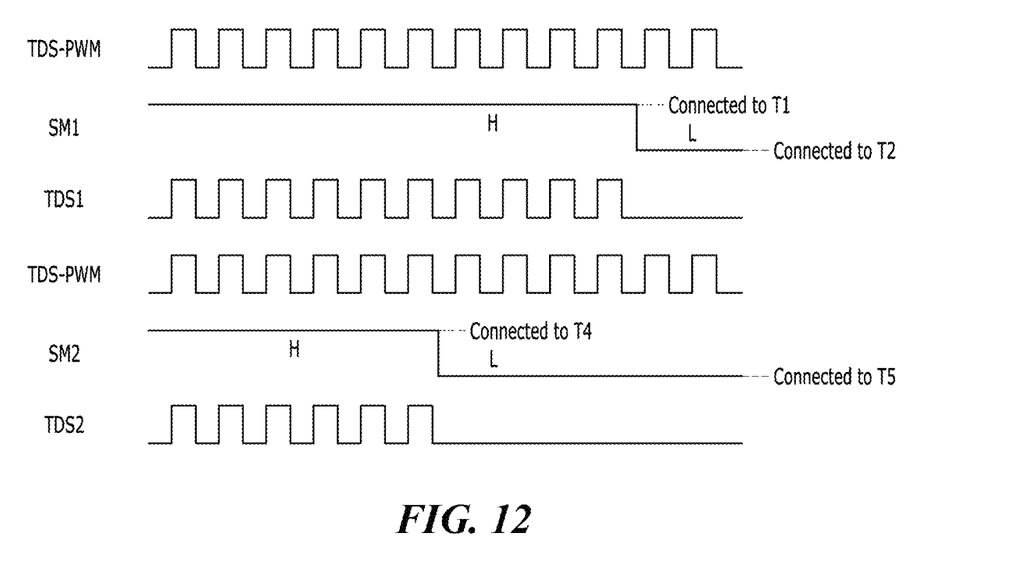
FIG. 12 is a diagram illustrating an operation timing of each of touch driving signal (TDS) drivers included in a first touch circuit according to the present embodiment.

FIG. 11 is a diagram illustrating a detailed configuration of a touch circuit according to the present embodiment, and FIG. 12 is a diagram illustrating an operation timing of each of TDS drivers included in a first touch circuit according to the present embodiment.

Referring to FIG. 11, the touch circuit according to the present embodiment may include a first touch circuit 210A which performs a function of a TX driver and a second touch circuit 210B which performs a function of an RX driver.

The first touch circuit 210A may include a first TDS generator for driving a first touch block division line BIL1 and a second TDS generator for driving a second touch block division line BIL2.

The first TDS generator may generate a first touch block driving signal TDS1 to output to the first touch block division line BIL1. The first TDS generator may include a first terminal T1 which receives a reference pulse modulation signal TDS-PWM, a second terminal T2 which receives a ground voltage signal GND, a third terminal T3 which is selectively connected to the first terminal T1 or the second terminal T2 according to a first switching control signal SM1, and a first output buffer BUF1 which buffers an output of the third terminal T3 and may output the first touch block driving signal TDS1.

During a high period H of the first switching control signal SM1, the first terminal T1 may be connected to the third terminal T3, and thus, the reference pulse modulation signal TDS-PWM may be output as the first touch block driving signal TDS1. On the other hand, during a low period L of the first switching control signal SM1, the first terminal T1 may be connected to the second terminal T2, and thus, the ground voltage signal GND may be output as the first touch block driving signal TDS1. The number of pulses of the first touch block driving signal TDS1 may be proportional to a length of the high period H of the first switching control signal SM1.

The second TDS generator may generate a second touch block driving signal TDS2 to output to the second touch block division line BIL2. The second TDS generator may include a fourth terminal T4 which receives the reference pulse modulation signal TDS-PWM, a fifth terminal T5 which receives the ground voltage signal GND, a sixth terminal T6 which is selectively connected to the fourth terminal T4 or the fifth terminal T5 according to a second switching control signal SM2, and a second output buffer BUF2 which buffers an output of the sixth terminal T6 and may output the second touch block driving signal TDS2.

During a high period H of the second switching control signal SM2, the fourth terminal T4 may be connected to the sixth terminal T6, and thus, the reference pulse modulation signal TDS-PWM may be output as the second touch block driving signal TDS2. On the other hand, during a low period L of the second switching control signal SM2, the fourth terminal T4 may be connected to the fifth terminal T5, and thus, the ground voltage signal GND may be output as the second touch block driving signal TDS2. The number of pulses of the second touch block driving signal TDS2 may be proportional to a length of the high period H of the second switching control signal SM2.

As in FIG. 12, when a length of the high period H of the first switching control signal SM1 is greater than that of the high period H of the second switching control signal SM2, the number of pulses of the first touch block driving signal TDS1 may more increase than the number of pulses of the second touch block driving signal TDS2.

The second touch circuit 210B may include a channel de-multiplexer CHMUX and a plurality of sensing units SU.

The channel de-multiplexer CHMUX may include a plurality of multiplexer circuits MUX. Each of the plurality of multiplexer circuits MUX may sequentially select one-by-one a plurality of touch lines TL connected to the touch blocks MBLK1 and MBLK2 in common and may be connected to a sensing unit SU corresponding to a selected touch line.

The sensing unit SU may include a preamplifier and an integral unit and may accumulate capacitance variations of corresponding touch electrodes TE to output touch raw data.

The present embodiment may realize the following effect.

The present embodiment may differentiate a real touch position from a ghost position in a multi-touch input and may thus prevent the occurrence of a phenomenon where an actually untouched point is abnormally recognized as a touch position.

The effects according to the present disclosure are not limited to the above examples, and other various effects may be included in the specification.

While the present disclosure has been particularly shown and described with reference to example embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensing display device comprising:
a first touch block including a plurality of first touch electrodes and a first additional electrode pattern;
a second touch block including a plurality of second touch electrodes and a second additional electrode pattern;
a plurality of touch lines, each touch line electrically connected to a first touch electrode of the plurality of first touch electrodes and to a second touch electrode of the plurality of second touch electrodes;
a first touch circuit configured to individually drive a first touch block division line connected to the first additional electrode pattern or a second touch block division line connected to the second additional electrode pattern; and
a second touch circuit configured to sense each touch line in synchronization with a driving timing of each of the first touch block division line or the second touch block division line.

2. The touch sensing display device of claim 1, wherein the first touch circuit is configured to supply a first touch block driving signal, which is for implementing first touch sensitivity, to the first additional electrode pattern through the first touch block division line, and
the first touch circuit is configured to supply a second touch block driving signal, which is for implementing second touch sensitivity, to the second additional electrode pattern through the second touch block division line.

3. The touch sensing display device of claim 2, wherein a number of pulses of the first touch block driving signal differs from a number of pulses of the second touch block driving signal.

4. The touch sensing display device of claim 3, wherein the first touch circuit comprises:
a first generator including a first terminal connected to receive a reference pulse modulation signal, a second terminal connected to receive a ground voltage signal, a third terminal configured to be selectively connected to the first terminal or the second terminal based on a first switching control signal, and a first output buffer configured to buffer an output of the third terminal, and to output the first touch block driving signal, and
a second generator including a fourth terminal connected to receive the reference pulse modulation signal, a fifth terminal connected to receive the ground voltage signal, a sixth terminal configured to be selectively connected to the fourth terminal or the fifth terminal based on a second switching control signal, and a second output buffer configured to buffer an output of the sixth terminal, and to output the second touch block driving signal.

5. The touch sensing display device of claim 4, wherein the number of pulses of the first touch block driving signal is proportional to a length of a high period of the first switching control signal, and
the number of pulses of the second touch block driving signal is proportional to a length of a high period of the second switching control signal.

6. The touch sensing display device of claim 5, wherein the length of the high period of the first switching control signal differs from the length of the high period of the second switching control signal.

7. The touch sensing display device of claim 2, wherein a pulse amplitude of the first touch block driving signal differs from a pulse amplitude of the second touch block driving signal.

8. The touch sensing display device of claim 2, wherein a number of pulses and a pulse amplitude of the first touch block driving signal differ from a number of pulses and a pulse amplitude of the second touch block driving signal, respectively.

9. The touch sensing display device of claim 1, wherein, in the first touch block, the first additional electrode pattern divides the plurality of first touch electrodes, and
in the second touch block, the second additional electrode pattern divides the plurality of second touch electrodes.

10. The touch sensing display device of claim 9, wherein the first additional electrode pattern has a mesh shape and surrounds each of the plurality of first touch electrodes in a same plane, and
the second additional electrode pattern has a mesh shape and surrounds each of the plurality of second touch electrodes in a same plane.

11. A touch sensing display device comprising:
a first touch block including a plurality of first touch electrodes and a first electrode pattern adjacent to the plurality of first touch electrodes;

a second touch block including a plurality of second touch electrodes and a second electrode pattern adjacent to the plurality of second touch electrodes;

a plurality of touch lines, each touch line electrically connected to a first touch electrode of the plurality of first touch electrodes and a second touch electrode of the plurality of second touch electrodes;

a first touch block division line connected to the first electrode pattern; and a second touch block division line connected to the second electrode pattern.

12. The touch sensing display device of claim 11, wherein the first touch electrode is located in a first position within the first touch block, the second touch electrode connected to a same touch line as the first touch electrode is located in a second position within the second touch block, the second position corresponding to the first position.

13. The touch sensing display device of claim 11, wherein the first touch block and the second touch block include a same number of touch electrodes.

14. The touch sensing display device of claim 13, wherein the plurality of touch lines include a same number of touch lines as the number of touch electrodes in the first touch block.

15. The touch sensing display device of claim 11, wherein the first electrode pattern surrounds each of the plurality of first touch electrode, and the second electrode pattern surrounds each of the plurality of second touch electrode.

16. The touch sensing display device of claim 11, comprising a sensing circuit configured to detect a first capacitance between a first touch electrode and the first electrode pattern or a second capacitance between a second touch electrode and the second electrode pattern.

17. The touch sensing display device of claim 16, wherein the sensing circuit includes a first circuit connected to the first touch block division line and the second touch block division line, and a second circuit connected to the plurality of touch lines.

18. The touch sensing display device of claim 16, wherein the first circuit is configured to individually drive the first touch block division line or the second touch block division line; and the second circuit is configured to sense each touch line when the first circuit individually driving each of the first touch block division line or the second touch block division line.

19. The touch sensing display device of claim 11, wherein a touch line of the plurality of touch lines is disposed in an active region, and is disposed on a layer different from a layer of a touch electrode connected to the touch line, and the touch line overlapping with the touch electrode.

20. The touch sensing display device of claim 11, which the first electrode pattern is on a same layer as the plurality of first touch electrodes.

* * * * *